US007979250B2

United States Patent
Archibald et al.

(10) Patent No.: US 7,979,250 B2
(45) Date of Patent: Jul. 12, 2011

(54) METHOD OF LAYING OUT A DATA CENTER USING A PLURALITY OF THERMAL SIMULATORS

(75) Inventors: Matthew R. Archibald, Morrisville, NC (US); Richard C. Chu, Hopewell Junction, NY (US); Hendrik F. Hamann, Yorktown Heights, NY (US); Madhusudan K. Iyengar, Woodstock, NY (US); Roger R. Schmidt, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 821 days.

(21) Appl. No.: 11/950,747

(22) Filed: Dec. 5, 2007

(65) Prior Publication Data

US 2009/0150123 A1 Jun. 11, 2009

(51) Int. Cl.
G06F 17/50 (2006.01)
G06G 7/56 (2006.01)
G06G 7/50 (2006.01)
H02B 1/00 (2006.01)
G01K 13/00 (2006.01)
G01K 1/08 (2006.01)
G01K 7/16 (2006.01)
G01K 11/30 (2006.01)
G01K 1/16 (2006.01)
G01N 9/36 (2006.01)

(52) U.S. Cl. .............. 703/5; 703/1; 703/9; 361/600; 702/130; 702/131; 702/132; 702/133; 702/134; 702/135; 702/136; 374/134; 374/135

(58) Field of Classification Search .............. 703/1, 5, 703/9; 361/600; 702/130–136; 374/134, 374/135
See application file for complete search history.

(56) References Cited

U.S. PATENT DOCUMENTS

| 4,473,110 A | 9/1984 | Zawierucha |
| 4,681,744 A | 7/1987 | Weitman |
| 5,289,872 A | 3/1994 | Kent |
| 6,775,137 B2 * | 8/2004 | Chu et al. ............ 361/696 |

(Continued)

OTHER PUBLICATIONS

"Balance of Power: Dynamic Thermal Management for Internet Data Center", Sharma, Ratnesh et al. Feb. 18, 2003.*

(Continued)

*Primary Examiner* — Jason Proctor
*Assistant Examiner* — Nithya Janakiraman
(74) *Attorney, Agent, or Firm* — Dennis Jung, Esq.; Kevin P. Radigan, Esq.; Heslin Rothenberg Farley & Mesiti P.C.

(57) ABSTRACT

A method is provided for facilitating installation of one or more electronics racks within a data center. The method includes: placing a plurality of thermal simulators in the data center in a data center layout to establish a thermally simulated data center, each thermal simulator simulating at least one of airflow intake or heated airflow exhaust of a respective electronics rack of a plurality of electronics racks to be installed in the data center; monitoring temperature within the thermally simulated data center at multiple locations, and verifying the data center layout if measured temperatures are within respective acceptable temperature ranges for the data center when containing the plurality of electronics racks; and establishing the plurality of electronics racks within the data center using the verified data center layout, the establishing including at least one of reconfiguring or replacing each thermal simulator with a respective electronics rack.

20 Claims, 11 Drawing Sheets

U.S. PATENT DOCUMENTS

| | | | |
|---|---|---|---|
| 6,868,682 | B2 | 3/2005 | Sharma et al. |
| 7,170,745 | B2 * | 1/2007 | Bash et al. .................... 361/695 |
| 7,237,406 | B2 | 7/2007 | Voss et al. |
| 7,255,474 | B2 | 8/2007 | Cong et al. |
| 7,311,264 | B2 | 12/2007 | Franke et al. |
| 7,698,114 | B2 | 4/2010 | Hamann et al. |
| 7,726,144 | B2 * | 6/2010 | Larson et al. ................ 62/259.2 |
| 7,739,073 | B2 | 6/2010 | Hamann et al. |
| 7,832,925 | B2 | 11/2010 | Archibald et al. |
| 2003/0067745 | A1 * | 4/2003 | Patel et al. .................... 361/690 |
| 2004/0218355 | A1 | 11/2004 | Bash et al. |
| 2005/0122685 | A1 | 6/2005 | Chu et al. |
| 2005/0236145 | A1 | 10/2005 | Arai et al. |
| 2007/0032979 | A1 | 2/2007 | Hamann et al. |
| 2007/0291817 | A1 | 12/2007 | Bradicich et al. |
| 2008/0154534 | A1 | 6/2008 | Bash et al. |
| 2008/0281551 | A1 | 11/2008 | Hamann et al. |
| 2008/0300818 | A1 | 12/2008 | Brey et al. |
| 2009/0150133 | A1 | 6/2009 | Archibald et al. |
| 2009/0207880 | A1 | 8/2009 | Ahladas et al. |

OTHER PUBLICATIONS

Claassen et al., "Techniques for Analyzing Data Center Energy Utilization Practices", U.S. Appl. No. 11/750,325, filed May 17, 2007.

Schmidt et al., "Best Practices for Data Center Thermal Management—Review of Literature", ASHRAE Transactions, vol. 113, Part 1, pp. 1-13, DA-07-022 (2006).

Schmidt et al., "Thermal Profile of a High-Density Data Center: Hot Spot Heat Fluxes of 512 W/ft2", ASHRAE Transactions, vol. 111, Part 2, pp. 1-13, DE-05-11-6 (2005).

Roger R. Schmidt, "Thermal Provide of a High-Density Data Center—Methodology to Thermally Characterize a Data Center", ASHRAE Transactions: Symposia, NA-04-4-2 (2004).

Schmidt et al., "Thermal Profile of World's 3rd Fastest Supercomputer—IBM's ASC Purple Cluster", ASHRAE Summer Annual Meeting (Jun. 21-25, 2006).

"High Performance Data Centers: A Design Guidelines Sourcebook", Pacific Gas & Electric (PG&E) White Paper, Pacific Gas & Electric Company, Berkeley National Laboratory for PG&E (2006).

Office Action Restriction Requirement issued for U.S. Appl. No. 11/950,758 (U.S. Letters Patent No. 7,832,925 B2), dated Mar. 29, 2010.

Notice of Allowance issued for U.S. Appl. No. 11/950,758 (U.S. Letters Patent No. 7,832,925 B2), dated Jul. 9, 2010.

Office Action issued for U.S. Appl. No. 11/950,735 (U.S. Patent Publication No. 2009/0150133 A1), dated Aug. 20, 2010.

Archibald et al., "Fluid Distribution Apparatus and Method Facilitating Cooling of Electronics Rack(s) and Simulating Heated Airflow Exhaust of Electronics Rack(s)", U.S. Appl. No. 12/887,551, filed Sep. 22, 2010.

* cited by examiner

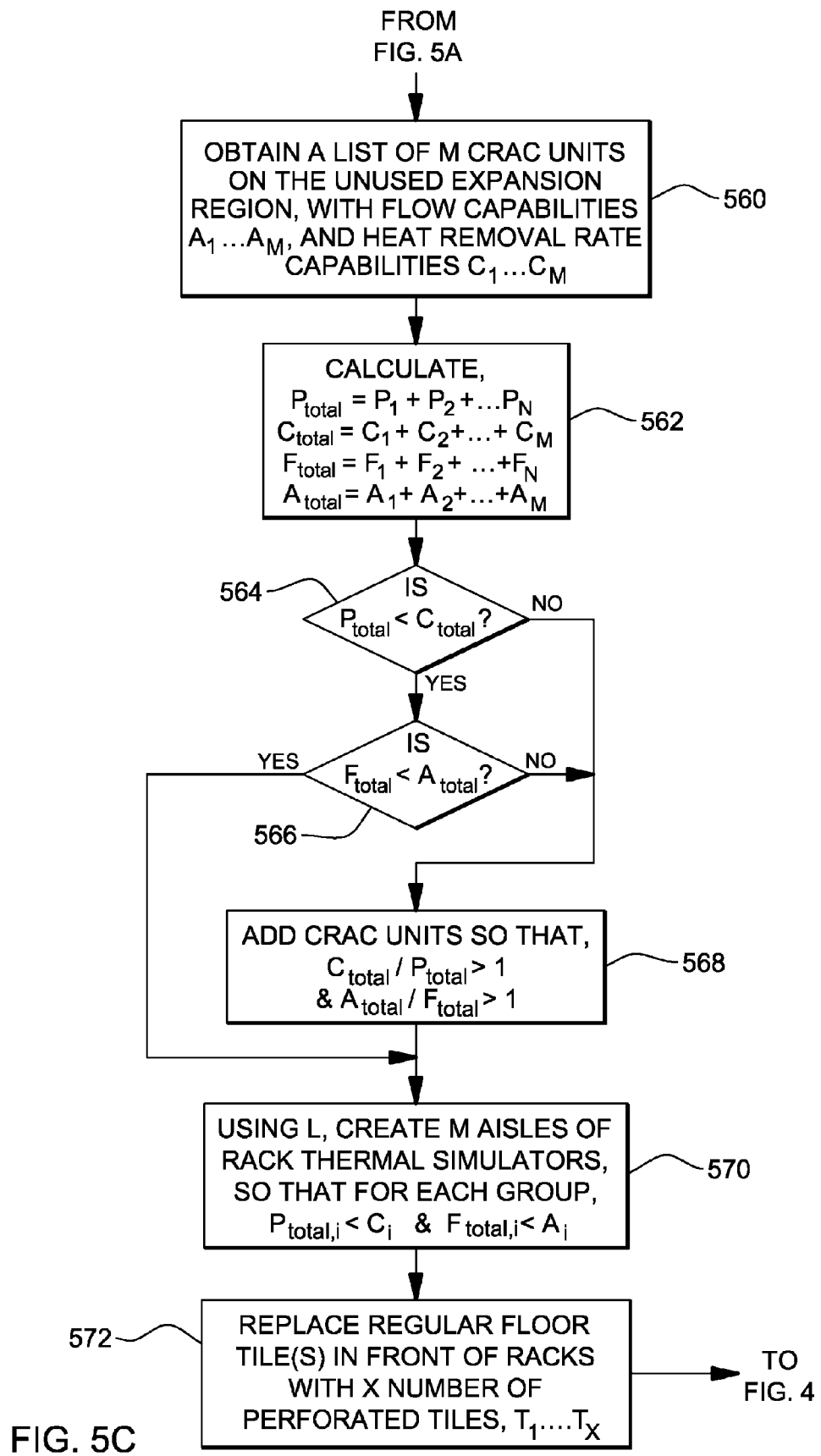

METHOD OF LAYING OUT A DATA CENTER USING A PLURALITY OF THERMAL SIMULATORS

TECHNICAL FIELD

The present invention relates in general to methods for laying out a data center, and more particularly, to methods for laying out and verifying a data center layout using actual thermal simulation of the data center.

BACKGROUND OF THE INVENTION

The power dissipation of integrated circuit chips, and the modules containing the chips, continues to increase in order to achieve increases in processor performance. This trend poses a cooling challenge at both the module and system level. Increased airflow rates are needed to effectively cool high power modules and to limit the temperature of the air that is exhausted into the computer center.

In many large server applications, processors along with their associated electronics (e.g., memory, disk drives, power supplies, etc.) are packaged in removable drawer configurations stacked within a rack or frame. In other cases, the electronics may be in fixed locations within the rack or frame. Typically, the components are cooled by air moving in parallel airflow paths, usually front-to-back, impelled by one or more air moving devices (e.g., fans or blowers). In some cases it may be possible to handle increased power dissipation within a single drawer by providing greater airflow, through the use of a more powerful air moving device or by increasing the rotational speed (i.e., RPMs) of an existing air moving device. However, this approach is becoming problematic at the rack level in the context of a computer installation (e.g., data center).

The sensible heat load carried by the air exiting the rack is stressing the ability of the room air conditioning to effectively handle the load. This is especially true for large installations with "server farms" or large banks of computer racks close together. In such installations not only will the room air conditioning be challenged, but the situation may also result in recirculation problems with some fraction of the "hot" air exiting one rack unit being drawn into the air inlet of the same rack or a nearby rack. This recirculating flow is often extremely complex in nature, and can lead to significantly higher rack inlet temperatures than expected. This increase in cooling air temperature may result in components exceeding their allowable operating temperature or in a reduction in long term reliability of the components.

Addressing thermal imbalances within a data center is often an expensive and time consuming operation. Therefore, there is a need in the art for methods which facilitate thermal and energy based design, analysis and optimization of electronics equipment of a data center.

SUMMARY OF THE INVENTION

The shortcomings of the prior art are overcome and additional advantages are provided through the provision of a method for laying out a data center. The method includes: placing a plurality of thermal simulators in the data center in a data center layout to establish a thermally simulated data center, wherein each thermal simulator simulates at least one of airflow intake or heated airflow exhaust of at least one respective electronics rack of a plurality of electronics racks to be disposed in the data center; monitoring temperature within the thermally simulated data center at multiple locations, and verifying the data center layout if the measured temperatures at the multiple locations are within respective acceptable temperature ranges for the data center when containing the plurality of electronics racks; and establishing the plurality of electronics racks within the data center using the verified data center layout, the establishing comprising one of reconfiguring or replacing each thermal simulator of the plurality of thermal simulators with the at least one respective electronics rack of the plurality of electronics racks.

In a further aspect, a method of laying out a data center is provided. This method includes: obtaining N rack thermal simulators corresponding to N electronics racks to be installed in a data center, wherein $N \geq 1$; adjusting at least one of power consumption or airflow settings for the N rack thermal simulators so that each rack thermal simulator has at least one of a power consumption or airflow therethrough which corresponds to a power rating or an airflow rating of a respective electronics rack of the N electronics racks; placing the N rack thermal simulators in the data center using a data center layout to establish a thermally simulated data center; monitoring temperature of the thermally simulated data center at multiple locations, and checking to determine whether there is a cooling problem or an energy inefficiency problem within the thermally simulated data center, and if so, correcting the cooling problem or energy inefficiency problem before verifying the data center layout; and establishing the N electronics racks within the data center using the verified data center layout, the establishing including at least one of reconfiguring or replacing each rack thermal simulator of the N rack thermal simulators with a respective electronics rack of the N electronics racks.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2A is an enlarged view of one rack thermal simulator of the plurality of rack thermal simulators of FIG. 2, in accordance with an aspect of the present invention;

FIGS. 5A-5C are a flowchart of one embodiment of a method for installing thermal simulators within a data center to establish a thermally simulated data center, in accordance with an aspect of the present invention;

DETAILED DESCRIPTION OF THE INVENTION

As used herein, the terms "electronics rack", "rack-mounted electronic equipment", and "rack unit" are used interchangeably, and unless otherwise specified include any housing, frame, rack, compartment, blade server system, etc., having one or more heat generating components of a computer system or electronics system, and may be, for example, a stand alone computer processor having high, mid or low end processing capability. An electronics rack comprises at least one electronics subsystem. "Electronics subsystem" refers to any sub-housing, blade, book, drawer, node, compartment, etc., having one or more heat generating electronic components disposed therein. Each electronics subsystem of an electronics rack may be movable or fixed relative to the electronics rack, with the electronics drawers of a multi-drawer rack unit and blades of a blade center system being two examples of electronics subsystems of an electronics rack. As used herein, a "thermal simulator" lacks the electronics subsystem or electronics subsystems of (for example) the electronics rack to be simulated.

In addition, "data center" refers to a computer installation to contain one or more electronics racks to be cooled. As a specific example, a data center may be designed to contain one or more rows of rack-mounted computing units, such as server units. Further, as used herein, "fluid-to-air heat exchanger" means any heat exchange mechanism characterized as described herein through which fluid can circulate; and includes, one or more discrete fluid-to-air heat exchangers coupled either in-series or in parallel. A fluid-to-air heat exchanger may comprise, for example, one or more fluid flow paths, formed of thermally conductive tubing (such as copper or other tubing) in thermal communication with (in one example) a plurality of thermally conductive fins. Size, configuration and construction of the fluid-to-air heat exchanger can vary without departing from the scope of the invention disclosed herein.

One example of the hot fluid discussed below is water. However, the concepts disclosed herein are readily adapted to use with other types of fluid. For example, a dielectric liquid, a fluorocarbon liquid, a fluoroinert liquid, a liquid metal, a brine, steam, flue gas, combustion-related gas, or other similar fluid may be employed, while still maintaining the advantages and unique features of the present invention.

Reference is made below to the drawings, which are not drawn to scale for reasons of understanding, wherein the same reference numbers used throughout different figures designate the same or similar components.

Figure 1:
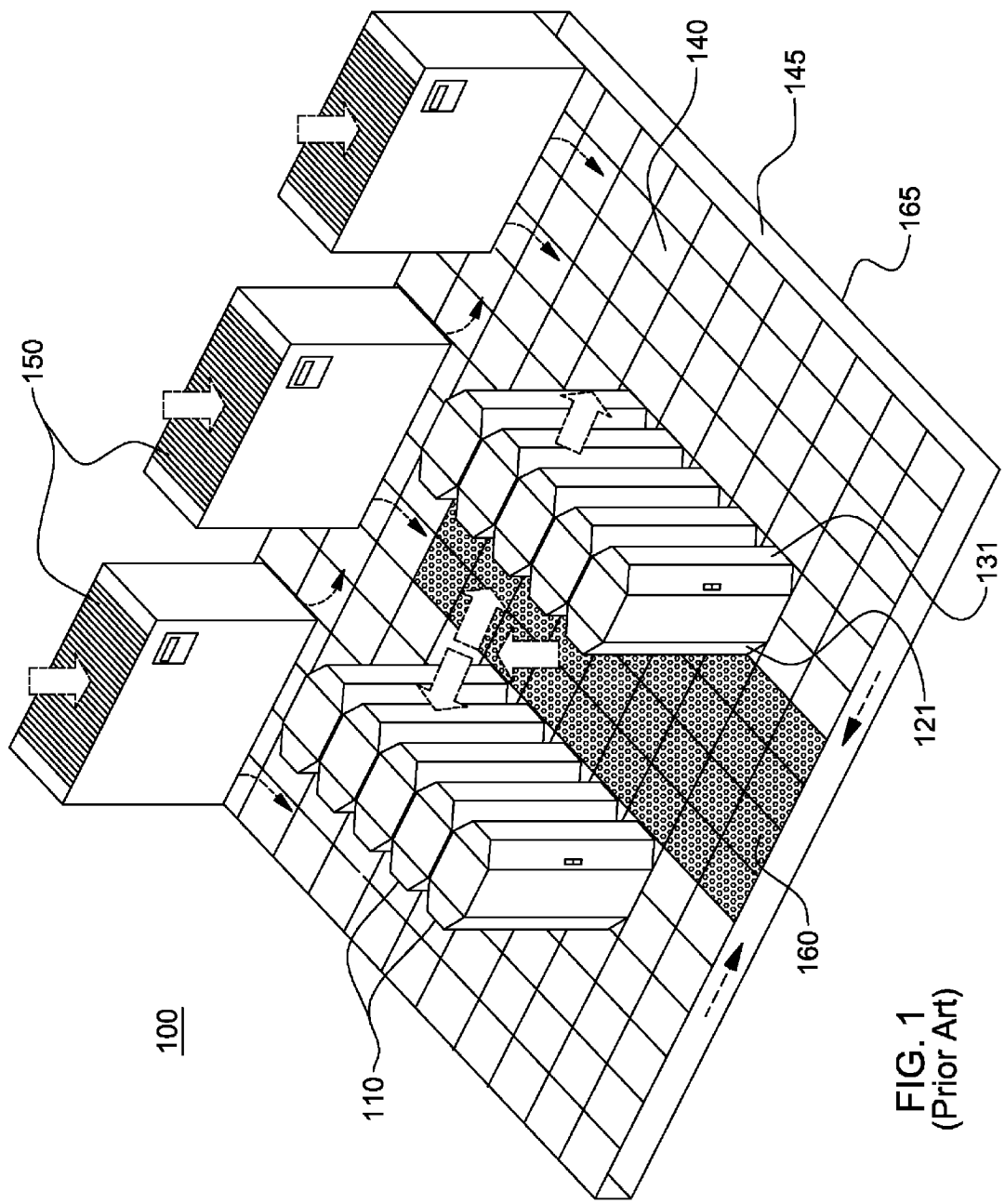
FIG. 1 depicts one embodiment of a conventional raised floor layout of an air-cooled data center.

As shown in FIG. 1, in a raised floor layout of an air cooled computer installation or data center 100 typical in the prior art, multiple electronics racks 110 are disposed in one or more rows. A computer installation such as depicted in FIG. 1 may house several hundred, or even several thousand micropro-cessors. In the arrangement of FIG. 1, chilled air enters the computer room via floor vents from a supply air plenum 145 defined between the raised floor 140 and a base or sub-floor 165 of the room. Cooled air is taken in through louvered air inlet doors 121 of the electronics racks and expelled through louvered air outlet doors 131 of the electronics racks. Each electronics rack 110 may have an air moving device (e.g., fan or blower) to provide forced inlet-to-outlet airflow to cool the electronic components within the electronics subsystem(s) of the rack. The supply air plenum 145 provides conditioned and cooled air to the air-inlet sides of the electronics racks via perforated floor tiles 160 disposed in a "cold" air aisle of the data center. The conditioned and cooled air is supplied to plenum 145 by one or more air-conditioning units 150, also disposed within data center 100. Room air is taken into each air-conditioning unit 150 near an upper portion thereof. This room air often comprises (in part) exhausted air from the "hot" air aisles of the data center disposed adjacent to air outlet sides of the electronics racks 110.

Limiting factors for cooling an air-cooled data center, such as data center 100 in FIG. 1, are related to the maximum chilled airflow rate that can be supplied from a single perforated tile, the maximum cooling capability of the air-conditioning units within the data center, and the hot air recirculation phenomenon that is common in such data centers. Hot air recirculation occurs when the total flow rate of supplied chilled air in front of an electronics rack is less than the total airflow rate through the electronics rack, leading to the hot exhaust from one electronics rack being drawn into the intake of the same or another electronics rack, thus resulting in potentially unacceptably high air inlet temperatures. This can impact the reliability and performance of the electronics within the rack, and lead to device failure in extreme cases.

Typically, data center thermal issues are addressed using one of two approaches. In the first approach, a human expert and some degree of trial and error are employed to make changes in the data center by changing layout of, for example, the perforated tiles, the electronics racks, the air-conditioning units, room geometry (ceiling, walls, partitions, ducts, types of tiles), or by changing the operating point of the air-conditioning units (air or liquid flow rates, set point temperatures). Alternatively, a computer-based technique to model the data center may be employed to simulate several "what if?" scenarios, followed by a plan for making actual changes in the data center layout to improve cooling of the electronics racks.

There are two dominant problems with computer-based modeling techniques. The first is the difficulty in obtaining accurate model input information. While it is difficult to obtain accurate model input information of server racks, it is even more difficult to obtain accurate input information before installation. Such input can include the detailed physical description of the above and under-floor parts of a data center, rack power and rack flow information, tile airflow rates, and tile air temperature (which can vary), to name a few. Computer-based models also require a number of assumptions. For example, computer-based models usually assume that there is no draft or air blowing across the room from various poorly sealed boundaries of the room, and they assume that there is no escape route for air in the under-floor plenum perimeter where some cold air could, in reality, "disappear". Also, electronics racks are typically represented as perfectly rectangular units with uniform airflow and uniform heat dissipation profiles, which is often not the case.

Another problem with computer-based modeling techniques is the inherent inaccuracies arising from physics-based assumptions that are made to construct the model. These assumptions are embedded in the solver engine of the modeling tool. One example might be the use of a certain turbulence model to characterize the flow physics which would bring with it several assumptions. While such a turbulence model might be applied globally, it might only work well for certain spatial areas of the data center. Another example could be the assumption that natural convection (or buoyancy-driven flow) contributes very little to the temperature gradients in the room. Yet another assumption could be the use of fluid properties which do not vary with temperature. Such assumptions can contribute to differences between model results in air temperatures versus actual measurement data, even when the model inputs are very accurate and detailed.

Therefore, actual installation and a certain degree of trial and error are believed necessary to attain an optimized data center layout. After installation, however, it is often difficult and costly to change one or more design parameters of the data center, such as the position and number of air-conditioning units, or the layout of the electronics racks. Thus, presented herein are apparatuses and methods which address this problem of trial and error installation optimization.

Figure 2:
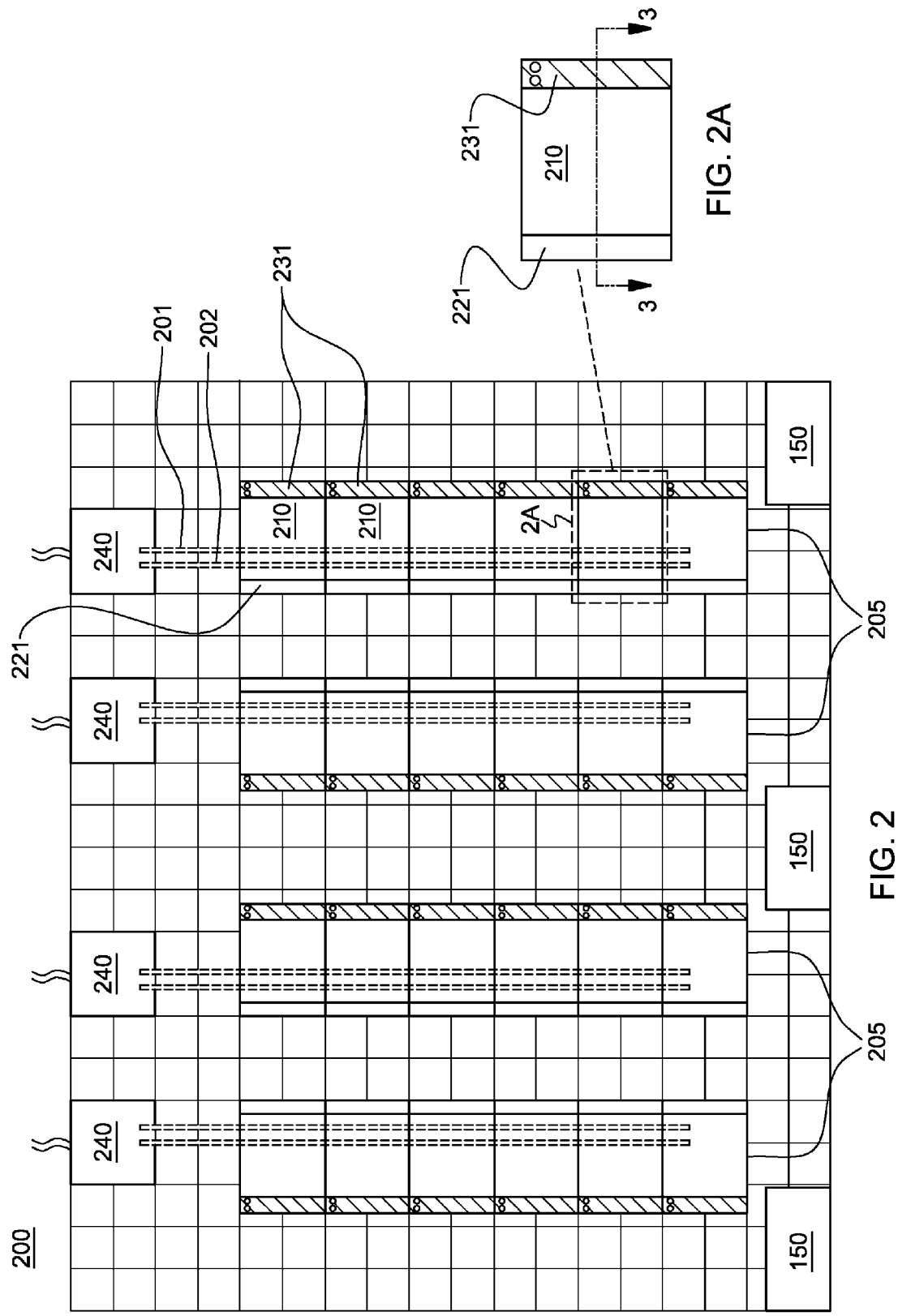
FIG. 2 depicts one embodiment of a thermally simulated data center layout comprising a plurality of rack thermal simulators, multiple fluid distribution units, and multiple air-conditioning units, in accordance with an aspect of the present invention.

FIG. 2 depicts an alternate data center layout, generally denoted 200, containing a plurality of rack thermal simulators 210 (in accordance with an aspect of the present invention). In this embodiment, multiple rows 205 of rack thermal simulators 210 are provided, with each row having a respective hot fluid distribution unit 240 connected thereto via a fluid supply header 201 and a fluid return header 202 running, in one embodiment, under the raised floor of the data center. Multiple computer room air-conditioning units 150 are also shown disposed within data center layout 200.

FIG. 2A depicts an enlarged view of one rack thermal simulator 210. As shown, rack thermal simulator 210 includes an inlet door 221 and an outlet door 231. In one embodiment, inlet door 221 is hingedly connected along one edge to rack thermal simulator 210 at the air inlet side thereof, and outlet door 231 is hingedly connected along one edge to rack thermal simulator 210 at the air outlet side thereof.

Figure 3:
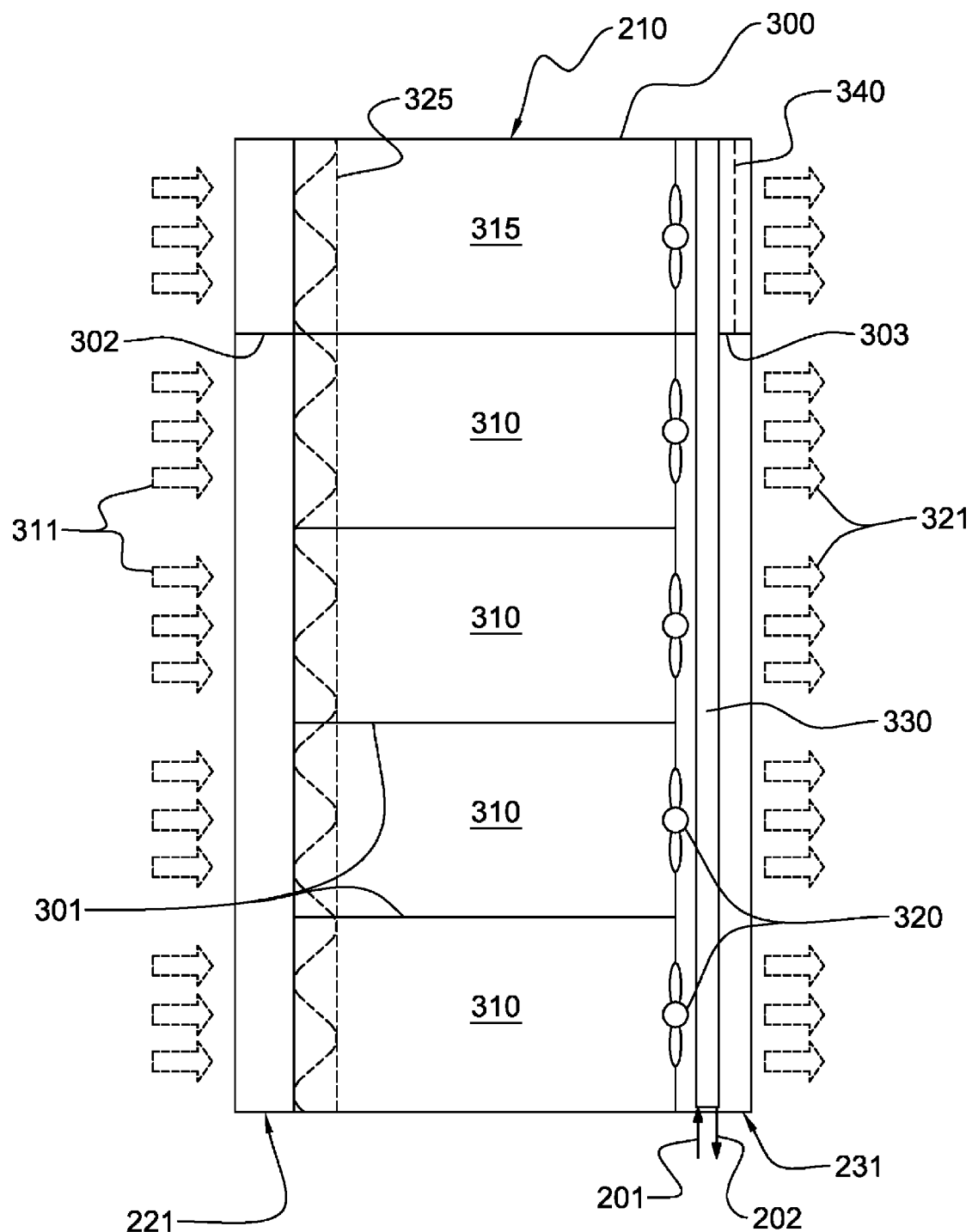
FIG. 3 is a cross-sectional elevational view of the rack thermal simulator of FIG. 2A, taken along line 3-3, in accordance with an aspect of the present invention.

FIG. 3 is a cross-sectional elevational view of the rack thermal simulator 210 of FIG. 2A, taken along line 3-3. As shown, rack thermal simulator 210 includes a rack frame 300 with multiple, horizontally-oriented flow partition plates 301 dividing the rack frame into multiple subsections 310, 315. Each subsection is sized to correspond to an electronics subsystem of the respective electronics rack being thermally simulated. In this example, one subsection 315 is isolated from the other subsections 310, with airflow into and from subsection 315 being isolated from airflow into and from the remaining subsections 310. This is accomplished using a front flow partitioning plate 302 and a back flow partitioning plate 303 disposed or extending into inlet door 221 and outlet door 231, respectively.

Multiple air-moving devices 320 draw external air 311 through inlet door 221 and the respective subsections 310, 315 of rack frame 300 for expelling out through outlet door 231 as airflow exhaust 321. In one example, each subsection 310, 315 includes one or more air-moving devices 320, and the air-moving devices are separately controllable so that airflow through the respective subsections can be tailored to simulate airflow through the corresponding electronics subsystems of the respective electronics rack being simulated. Each subsection may include an airflow impedance filter 325 tailored to establish an airflow impedance through rack thermal simulator 210 correlated to the airflow impedance through the respective electronics rack being simulated. More particularly, by providing horizontally-oriented flow partitioning plates 301, 302 & 303, airflow impedance filters 325, and air-moving devices 320, airflow through the respective subsections of rack thermal simulator 210 can be tailored to mirror airflow through the corresponding electronics subsystems of the electronics rack being simulated.

One or more flow profile plates 340 may also be used in rack thermal simulator 210 to configure the airflow exhaust 321 from one or more subsections 315, 310 of the simulator. This allows a more realistic simulation of the airflow exhaust from the corresponding electronics subsystems of the electronics rack being simulated.

Advantageously, the above-described thermal simulators are used herein to establish a thermally simulated data center to, for example, characterize, optimize and prepare for electronics equipment installation within the data center. Thermal simulation can be carried out at either the electronics subsystem, electronics rack, row (or aisle) or data center level. By way of example, rack level simulation is described herein. Thermal simulation can include actual simulation of one or more of the following: the consumption of electrical power at the subsystem/rack/row/data center level; the generation of pressurized airflow at the subsystem/rack/row/data center level; heating of the generated airflow at the subsystem/rack/row/data center level; correlation of localized heating of air with localized consumption of electricity; reproduction of airflow and heating profiles at the subsystem/rack/row/data center level; and the use of, for example, hot fluid, or other sources of heat, such as electrical air heating, conduction air heating, microwave heating, laser heating, solar heating, geothermal heating, process fluid heating, building waste heat sources, and other such sources of heat, in place of the heat generating electronics subsystems of the electronics racks being simulated.

Thermal characterization of a data center includes characterizing, using the thermal simulators described herein, power, temperature and/or airflow within the data center, production of a detailed documentation of data center layout and geometry (e.g., to provide a context for measurements), and calculation of macro-parameters by summing/averaging parameters over the subsystem/rack/row/data center levels. Thermal optimization of a thermally simulated data center includes making heuristic-driven trial and error based changes in the data center layout that result in lower rack air inlet temperatures and/or lower cooling energy consumption within the data center. Apparatuses may be employed in optimizing the data center layout to achieve this effect. For example, hot spot temperatures may be reduced through the use of rack door heat exchangers or airflow arresters disposed, for example, between adjacent racks in a row or over the top of a rack thermal simulator.

Figure 4:
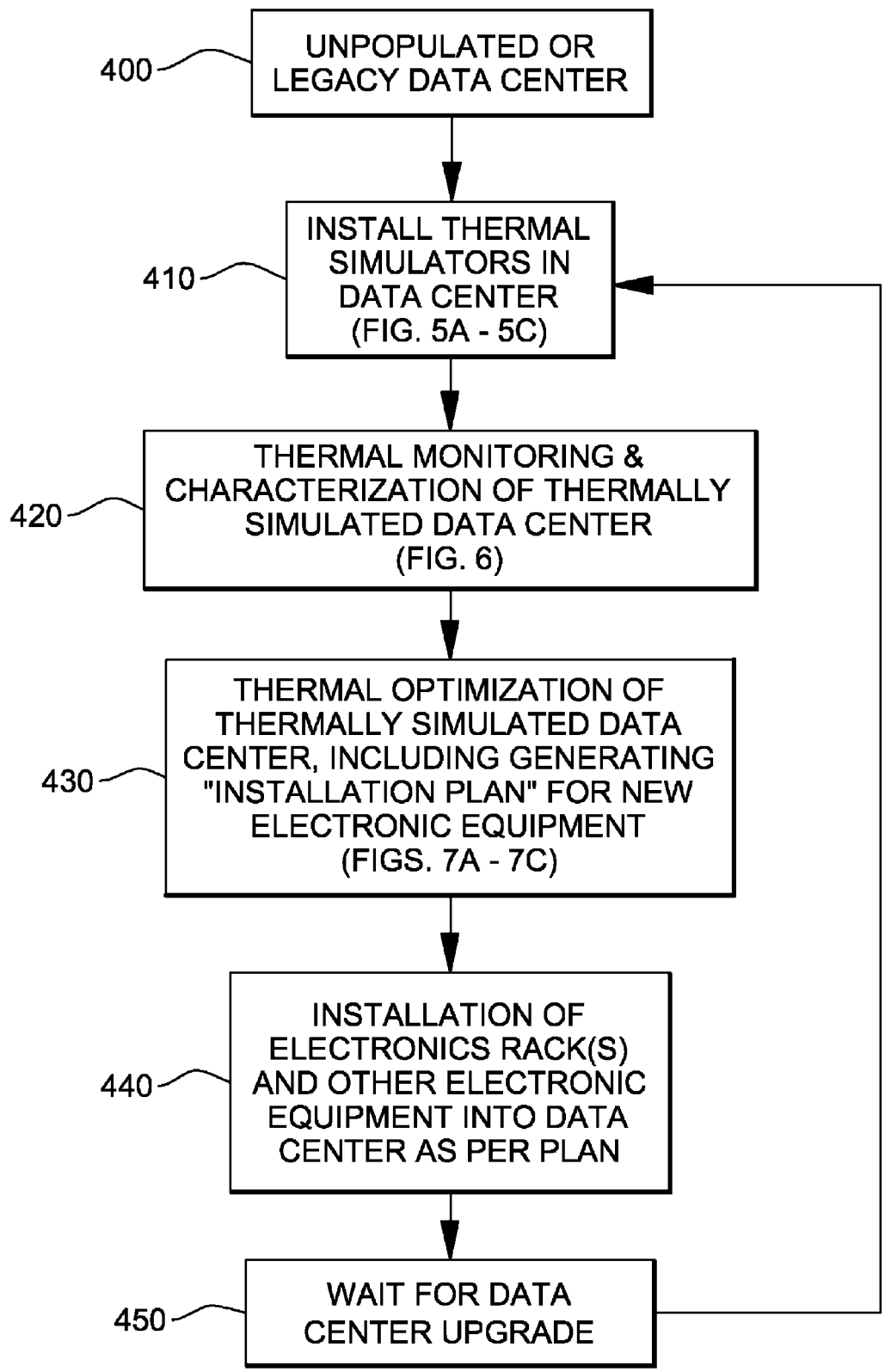
FIG. 4 is a flowchart of one embodiment of a method for verifying and optimizing a data center layout using a thermally simulated data center and for installing electronics racks and other electronics equipment within the data center using the verified data center layout, in accordance with an aspect of the present invention.

FIG. 4 depicts one embodiment of a flowchart for establishing, verifying and optimizing a data center layout using a plurality of rack thermal simulators, such as described above in connection with FIGS. 2-3. The process begins with either an unpopulated or legacy data center 400. As one example, "unpopulated" refers to a data center prior to installation of any electronics racks or air-conditioning units, while a "legacy" data center refers to a data center having, for example, one or more existing air-conditioning units and/or existing electronics racks disposed therein. A raised floor data center is assumed in the examples discussed hereinbelow. However, the concepts discussed are equally applicable to other data center configurations.

Figure 5A:
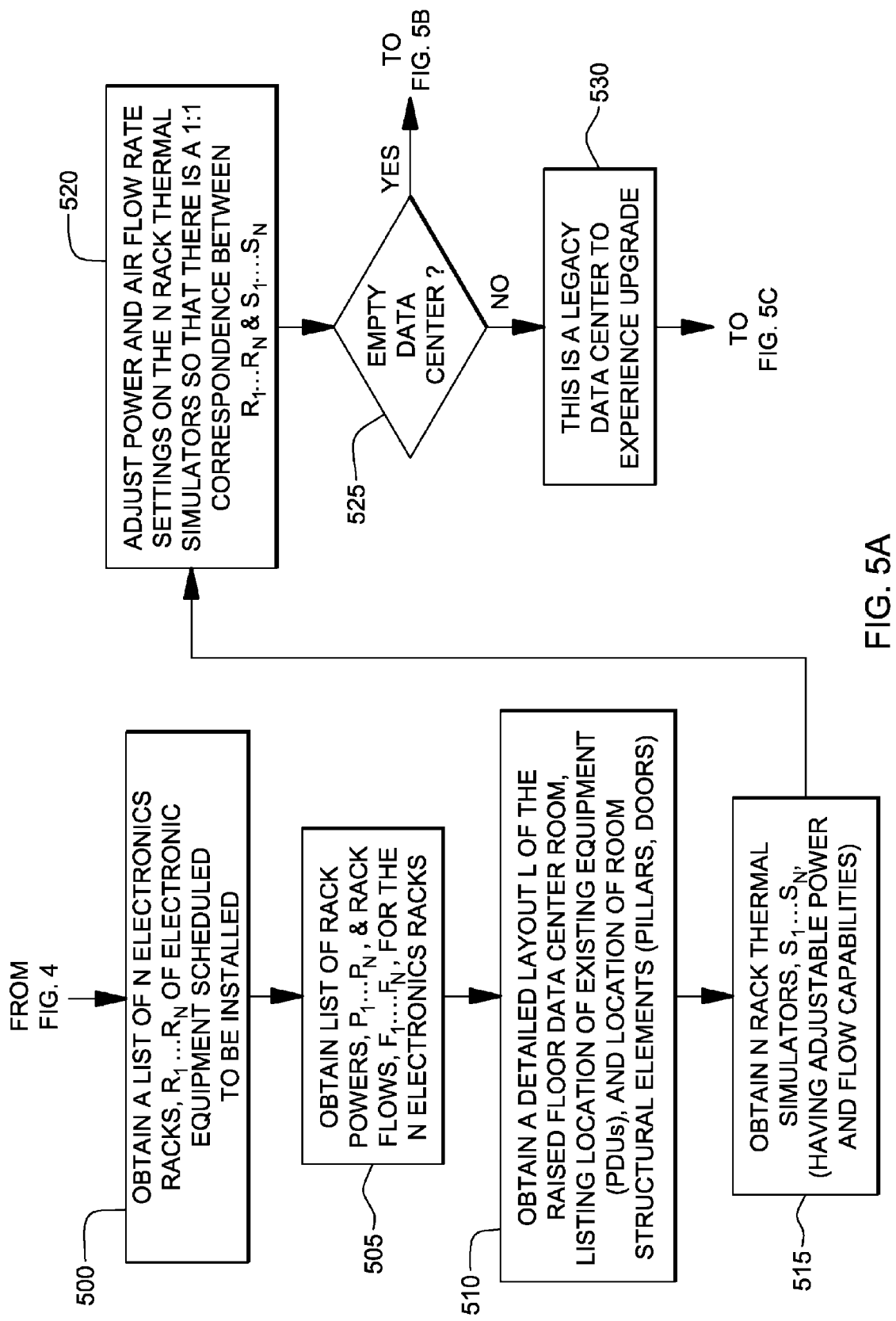
Figure 5B:
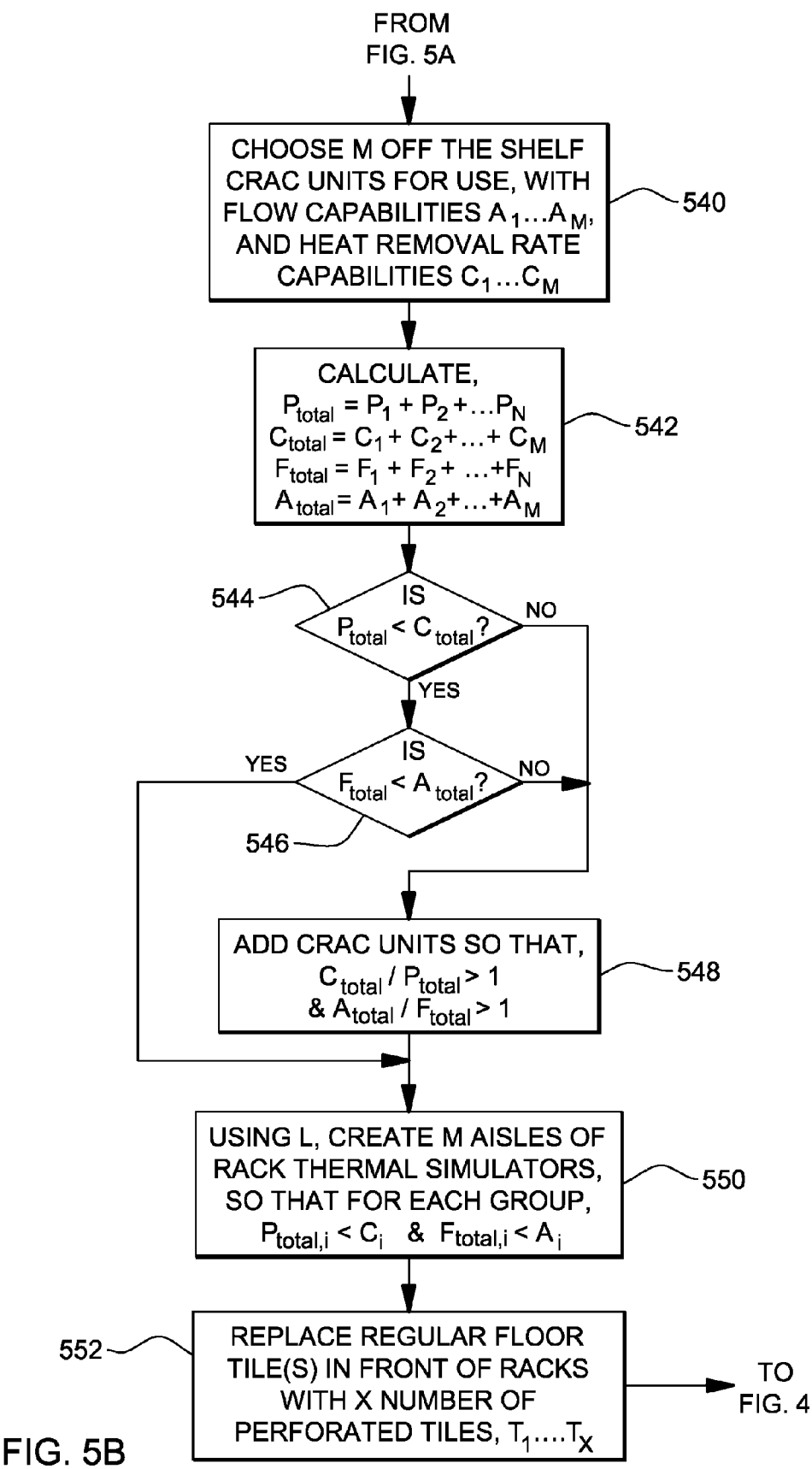

Thermal simulators are initially installed within the unpopulated or legacy data center 410. FIGS. 5A-5C depict one embodiment of a process for installing thermal simulators in a data center, in accordance with an aspect of the present invention.

Referring initially to FIG. 5A, a list is obtained of N electronics racks $R_1 \ldots R_N$ of electronic equipment scheduled to be installed in the data center 500. For this list of electronics racks, the rated rack powers $P_1 \ldots P_N$, and rated rack airflows therethrough $F_1 \ldots F_N$ are obtained 505. A detailed layout L of the raised floor data center room is next obtained, wherein location of existing equipment (such as PDUs) and room structural elements (such as pillars, doors, etc.) is noted 510. As one example, the initial layout L for the raised floor data center may be made per the preliminary judgment of an on-site custom engineer at the data center, in a same manner as would normally be done in laying out actual electronics racks within the data center. As another example, a detailed examination or survey of the data center can be conducted and this information can be translated into a detailed CAD or graphics model.

Next, N rack thermal simulators $S_1 \ldots S_N$ are obtained 515. By way of example, each rack thermal simulator may comprise a rack thermal simulator such as described above in connection with FIGS. 2-3. Alternatively, rack thermal simulators may be used such as described in co-filed, commonly assigned application Ser. No. 11/950,735, entitled "Apparatus and Method for Simulating One or More Operational Characteristics of an Electronics Rack", the entirety of which is hereby incorporated herein by reference. Advantageously, the rack thermal simulators used within the data center to thermally simulate the electronics rack within the data center are provided with adjustable power and adjustable airflow characteristics. By way of example, the airflow rate supplied to each air-moving device in a rack thermal simulator can be manipulated via control of an associated variable frequency drive device connected to the motor(s) of the air-moving device(s) within the simulator. Based on knowledge of a specified airflow rate of the respective electronics rack being simulated, the airflow rate through each rack thermal simulator is set to a specific value. Setting of the airflow rate can be facilitated by utilizing knobs, dials, buttons, etc. provided on the rack thermal simulator for adjusting airflow rate, or can be automated via one or more control units programmed with appropriate logic and associated with the respective rack thermal simulators.

Power dissipated by each rack thermal simulator can be adjusted via valve-based controls provided to manipulate hot fluid flow being supplied to the rack thermal simulator. Such valve-based mechanisms may reside in the under-floor piping that makes up the hot fluid distribution apparatus. The temperature of hot fluid leaving the hot fluid distribution unit and the total fluid flow rate may be controlled at the hot fluid distribution unit. In the embodiment of FIG. 2, one hot fluid distribution unit provides hot fluid to six rack thermal simulators, via parallel plumbing, wherein each rack thermal simulator receives a same fluid flow rate at the same temperature. By using valves in the piping network, changes to the fluid flow rate to specific rack thermal simulators may be obtained. Further, the use of series-parallel piping arrangements can yield different temperatures to different racks. A larger fluid flow rate or higher temperature of fluid entering the fluid-to-air heat exchanger within a particular rack thermal simulator will result in a higher heat dissipation rate, and thus an adjustment to the simulation of power being consumed.

Continuing with FIG. 5A, the power and airflow rate settings on the N rack thermal simulators are adjusted so that there is a 1:1 correspondence one or both of these characteristics between the electronics racks $R_1 \ldots R_N$ and the rack thermal simulators $S_1 \ldots S_N$ 520. Processing then determines whether the data center is empty 525, and if so, continues with the process of FIG. 5B, otherwise, the data center is a legacy data center that is to experience an upgrade in electronics equipment 530, and processing continues with the process of FIG. 5C.

Assuming initially that the data center is unpopulated, then FIG. 5B discloses that M off the shelf computer room air-conditioning (CRAC) units are chosen for use within the data center, wherein the CRAC units have respective airflow capabilities $A_1 \ldots A_M$ and heat removal capabilities $C_1 \ldots C_M$ 540. Before installing the thermal simulators, the rated rack powers of the N electronics racks to be installed are summed ($P_{total}$), the heat removal rates (kW) of the CRAC units (either measured or rated) are summed ($C_{total}$), the airflow rates ($m^3/s$) of the electronics racks to be installed are summed ($F_{total}$), and the airflow rates ($m^3/s$) of the CRAC units (either measured or rated) are summed ($A_{total}$) 542. Processing then determines whether $P_{total} < C_{total}$ 544, and if "yes", whether $F_{total} < A_{total}$ 546. If either $P_{total}$ is not less than $C_{total}$ or $F_{total}$ is not less than $A_{total}$, then one or more CRAC units are added to the data center layout 548 until $C_{total}/P_{total} > 1$, and $A_{total}/F_{total} > 1$. Next, using layout L, M aisles of rack thermal simulators are established, so that for each aisle of rack thermal simulators $P_{total, i} < C_i$ and $F_{total, i} < A_i$, wherein each aisle (i) is assumed (in one example) to have associated therewith a respective CRAC unit (i) 550.

After placing the rack thermal simulators within the data centers, one or more regular floor tiles of the data center in front of the placed rack thermal simulators are replaced with x number of perforated tiles $T_1 \ldots T_x$ 552. Each rack thermal simulator is assumed to have airflow access to at least one respective perforated tile, which is preferably located (by way of example) as close to the rack thermal simulator inlet as possible. In a hot air aisle, cold air aisle rack arrangement, this results in the perforated tile(s) right in front of each rack thermal simulator being replaced by a perforated floor tile. Depending on the air pressure of the plenum under the perforated floor tile, and the degree of openness of the tile (e.g., 5%-60%), the tile might typically supply an airflow rate in the 50-1500 CFM range. A higher air pressure in the under-floor plenum, and a higher degree of openness (measured as a percent open area) results in a higher tile airflow rate. To a second order, the velocity vectors in the under-floor plenum and the location of blockages such as chiller piping and cable trays, may play a part in influencing the tile supply airflow rate to a respective rack thermal simulator. After installation of the perforated tiles, the process returns to FIG. 4 to thermally monitor and characterize the thermally simulated data center 420, as described below.

Returning to FIG. 5A, if the data center being thermally simulated is a legacy data center, then the process flow continues as illustrated in FIG. 5C. Many of the steps in this process are similar to those discussed above in connection with FIG. 5B. First, a list of M CRAC units on the unused expansion region within the legacy data center is obtained, including airflow capabilities $A_1 \ldots A_M$, and heat removal capabilities $C_1 \ldots C_M$ for the units 560. The rated electronics rack powers are summed ($P_{total}$), as are the heat removal rates of the CRAC units ($C_{total}$), the airflow rates of the electronics racks to be installed ($F_{total}$), and the airflow rates of the CRAC units ($A_{total}$) 562. Processing determines whether $P_{total} < C_{total}$ 564, and if so, whether $F_{total} < A_{total}$ 566. If either inquiry is not true, then one or more CRAC units are added until $C_{total}/P_{total} > 1$ and $A_{total}/F_{total} > 1$ 568. Once the number of CRAC units are set, the data center layout L is used to establish M aisles of rack thermal simulators (coupled in the embodiment of FIGS. 2 & 3 to one or more hot fluid distribution units) 570. The rack thermal simulator aisles are created so that $P_{total, i} < C_i$ and $F_{total, i} < A_i$, wherein (by way of example) each rack thermal simulator aisle is assumed to have associated therewith a respective CRAC unit (i). After setting the rack thermal simulators, one or more regular floor tiles in front of the rack thermal simulators are replaced with x number of perforated tiles $T_1 \ldots T_x$ 572 (as described above in connection with FIG. 5B). After placing the rack thermal simulators and replacing selected floor tiles with perforated tiles, processing returns to FIG. 4 to thermally monitor and characterize the resultant thermally simulated data center 420.

Figure 6:
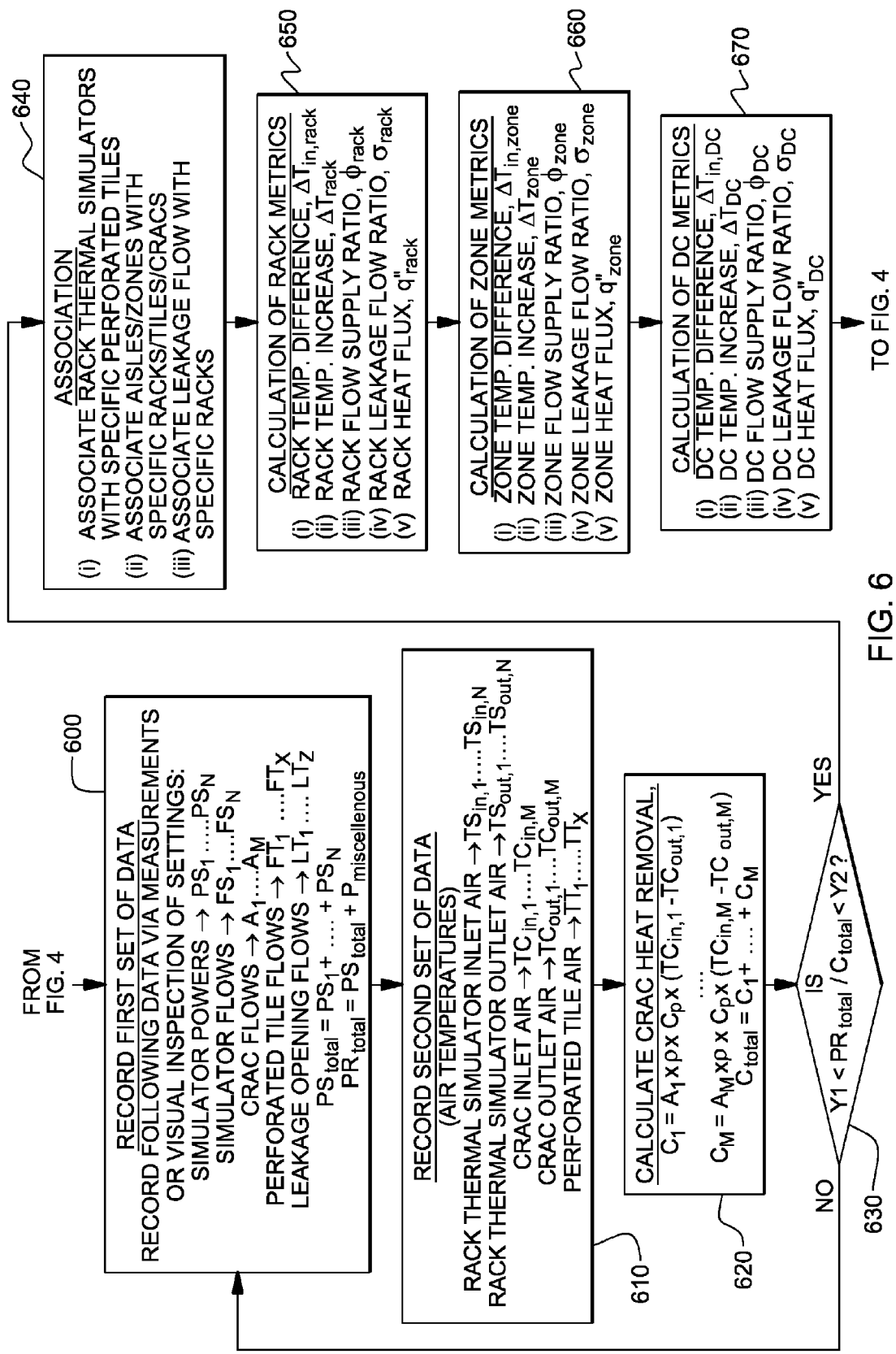
FIG. 6 is a flowchart of one embodiment for monitoring and characterizing temperatures within a thermally simulated data center, in accordance with an aspect of the present invention.

As noted in FIG. 4, one embodiment of thermally monitoring and characterizing the thermally simulated data center 420 is depicted in FIG. 6.

As noted in FIG. 6, a first set of data is initially recorded 600. This first set of data is obtained via measurements or visual inspections of simulator and CRAC unit settings. The data includes rack thermal simulator powers $PS_1 \ldots PS_N$, rack thermal simulator airflows $FS_1 \ldots FS_N$, CRAC unit airflows $A_1 \ldots A_M$, perforated tile airflows $FT_1 \ldots FT_X$, and leakage opening airflows $LT_1 \ldots LT_z$. In addition, a summation of rack power settings (kW) of the rack thermal simulators ($PS_{total}$) is calculated, as is the total power (kW) used within the data center ($PR_{total}$). In determining the total power used, $P_{miscellaneous}$ refers to a summation of the miscellaneous power consumption occurring within the data center, such as lighting, power distribution losses, etc. Note also that measuring various airflows can be accomplished using a commercially available hand-held airflow metering device.

After recording the power and airflows, a second set of data is recorded comprising air temperature measurements 610. This second set of data includes rack thermal simulator inlet air temperature ($TS_{in}$) for each of the N rack thermal simulators, rack thermal simulator outlet air temperature ($TS_{out}$) for the N rack thermal simulators, CRAC inlet air temperature ($TC_{in}$) for the M CRAC units, CRAC outlet air temperature ($TC_{out}$) for the M CRAC units, and perforated tile air temperature (TT) for the x perforated tiles employed in the data center layout. Next, the CRAC heat removal capability is calculated 620 as:

$$C_1 = A_1 \cdot \rho \cdot C_p \cdot (TC_{in,1} - TC_{out,1})$$
$$\vdots$$
$$C_M = A_M \cdot \rho \cdot C_p \cdot (TC_{in,M} - TC_{out,M})$$
$$C_{total} = C_1 + \ldots + C_M$$

wherein $\rho$ is the air mass density (kg/m³), and $C_p$ is the air specific heat (J/kg-K). The air mass density and air specific heat are readily attainable by one skilled in the art from available heat transfer handbooks.

Next, an energy balance check is made to verify that $PR_{total}/C_{total}$ is between two predefined values Y1 and Y2 630. By way of example, Y1 might be 0.9, and Y2 1.1, so that the energy balance $PR_{total}/C_{total}$ must be within ±10%.

A characterization phase is then entered wherein associations are first made 640. These associations include: associating the rack thermal simulators with specific perforated tiles within the data center layout; associating aisles/zones with specific racks/tiles/CRACs within the data center layout; and associating particular air leakage flow with specific rack thermal simulators within the data center layout. Thereafter, rack level metrics are calculated 650, which include: (i) the rack thermal simulator temperature difference ($\Delta T_{in, rack}$); the rack thermal simulator temperature increase ($\Delta T_{rack}$); the rack flow supply ratio ($\phi_{rack}$); the rack leakage flow ratio ($\sigma_{rack}$); and the rack heat flux ($q''_{rack}$). These metrics are defined in further detail in Table 1 below.

The corresponding zone level metrics are similarly calculated 660, as well as the corresponding data center level metrics 670. By way of example, zone level metrics might refer to a row or aisle of rack thermal simulators within the data center, while data center level metrics refers to the corresponding metrics for the entire data center. These metrics, as well as the other metrics and variables described herein, are defined in Table 1 below.

Figure 7A:
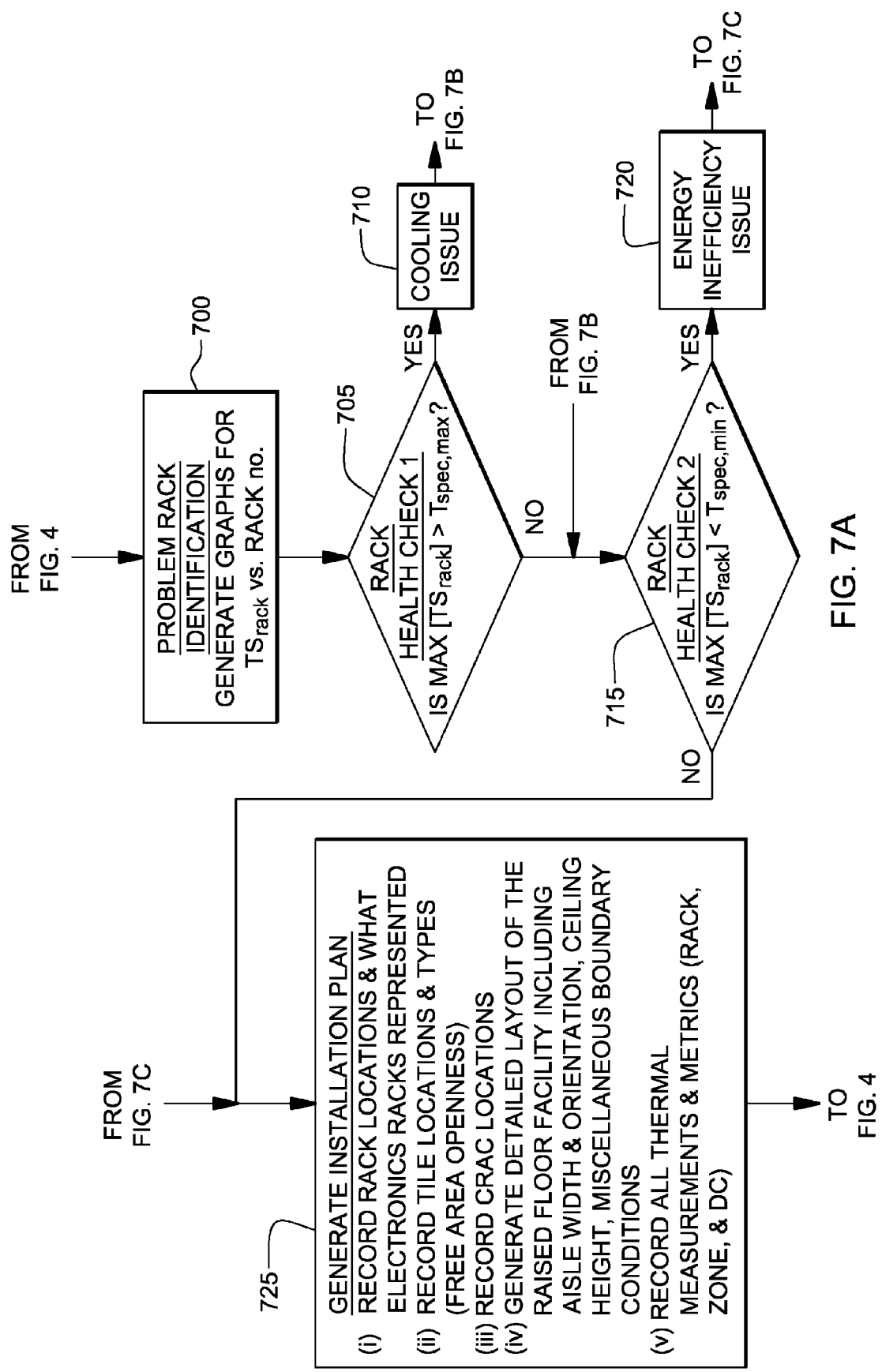
FIGS. 7A-7C are a flowchart of one embodiment of processing for identifying and correcting at least one of a cooling issue or an energy inefficiency issue, and for generating an installation plan for the plurality of electronics racks based on the data center layout employed in the thermally simulated data center, in accordance with an aspect of the present invention.

After determining the rack, zone and data center level metrics, processing returns to the flow of FIG. 4 to thermally optimize the simulated data center, and generate an installation plan for the electronics equipment 430. One embodiment of this processing is depicted in FIGS. 7A-7C.

The optimization process begins with identifying whether a problem at the rack thermal simulator level exists 700. This identification is facilitated by generating graphs of the air inlet temperature ($TS_{rack}$) to each simulator versus rack thermal simulator number. A first rack thermal simulator health check is performed by comparing the maximum air inlet temperature (MAX $TS_{rack}$) to each simulator with the rated or specified maximum air inlet temperature to the respective electronics rack being thermally simulated 705. By way of example, this maximum allowable electronics rack air inlet temperature to the electronics rack might be 32° C. If the maximum air inlet temperature to the thermal simulator is greater than the maximum allowable air inlet temperature to the respective electronics rack, then a cooling issue is identified 710, and addressed (in one embodiment) by the process of FIG. 7B.

Figure 7B:
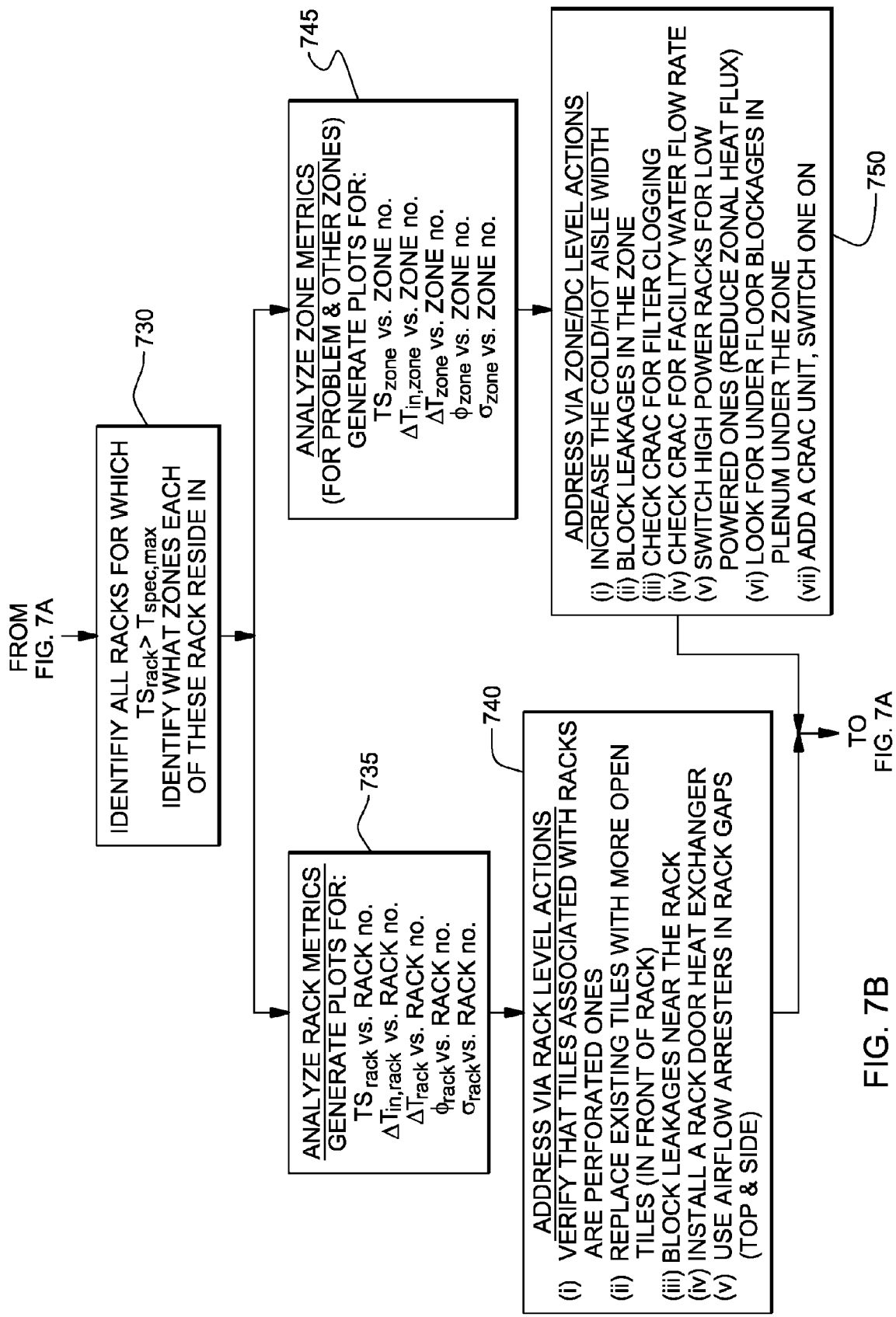
Figure 7C:
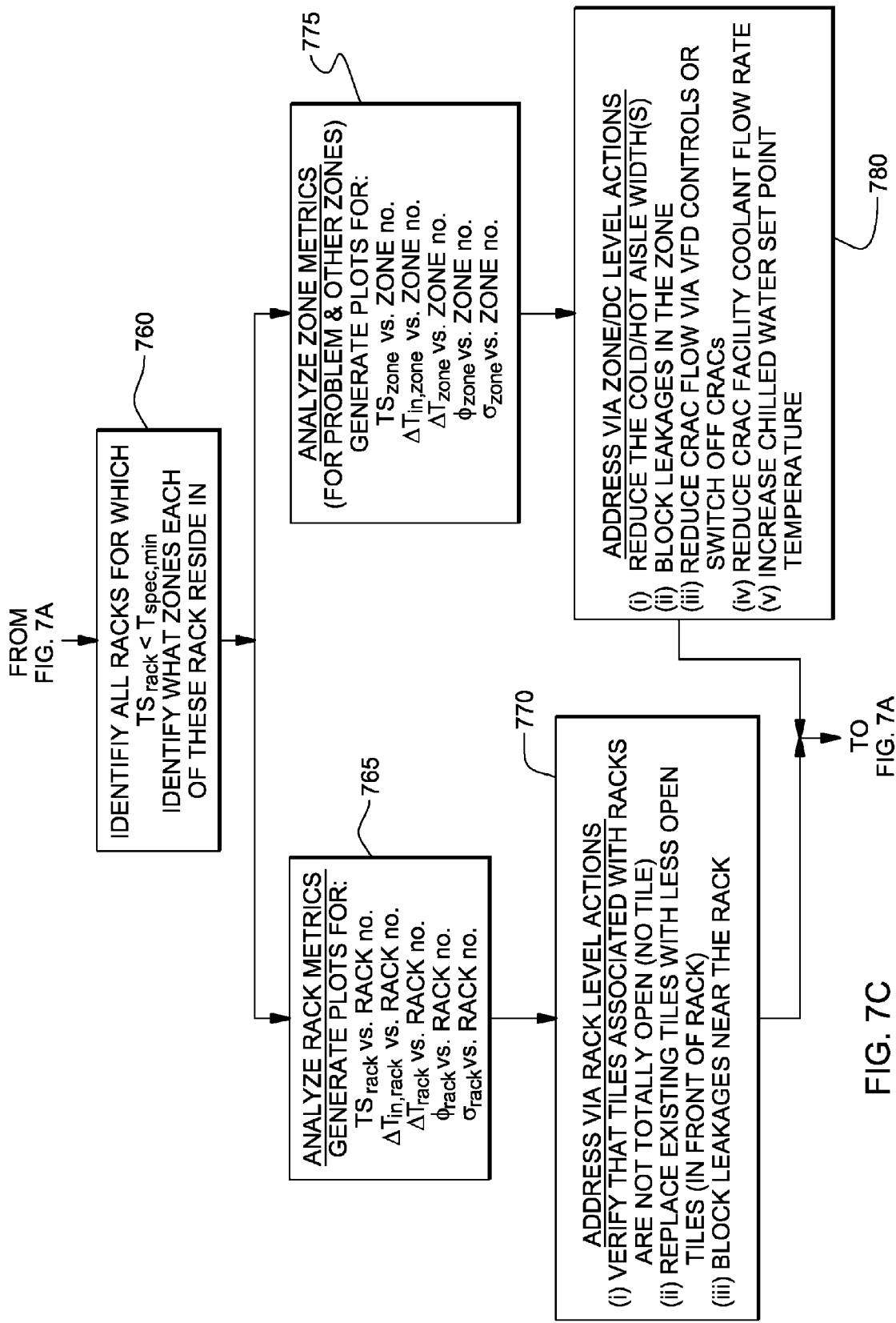

Referring to FIG. 7B, all rack thermal simulators are identified for which $TS_{rack} > T_{spec, max}$, as well as each zone within which such rack thermal simulators reside 730. Next, there is a parallel analysis and action taken at the rack thermal simulator level and the zone level. This parallel addressing of the problem identified is presented by way of example only. Alternatively, only the rack level metrics and actions might be employed, or only the zone level metrics and actions might be employed. As another alternative, the rack level metrics and zone level metrics might be employed in-series instead of in parallel.

Beginning with analyzing rack level metrics 735, plots are generated for: the measured air inlet temperatures to the rack thermal simulators versus thermal simulator number; the air temperature difference between the rack thermal simulator inlet and the air temperature of the perforated tile(s) associated with that rack thermal simulator versus thermal simulator number; the air temperature difference between the rack air outlet and rack air inlet (at a same vertical height) for each rack thermal simulator versus thermal simulator number; the ratio of chilled airflow supplied via perforated tiles to a rack thermal simulator to the rack thermal simulator airflow rate versus thermal simulator number; and the ratio of leakage flow associated with the rack thermal simulator to the total airflow supplied to the rack thermal simulator versus thermal simulator number.

Responsive to analyzing these plots and metrics, one or more actions are taken at the rack thermal simulator level to address the cooling issue 740. In one embodiment, these actions include one or more of: verifying that tiles associated with the rack thermal simulators are perforated tiles; replacing existing tiles with one or more open tiles (e.g., in front of the rack thermal simulator); blocking airflow leakages near the rack thermal simulator; installing a rack door heat exchanger to, for example, extract heat from airflow exhausting from the rack thermal simulator; or using airflow arresters in gaps between rack thermal simulators or over the top of rack thermal simulators to, for example, block hot air recirculation from the air outlet side to the air inlet side of one or more simulators.

Analyzing zone level metrics 745 includes generating plots of the same temperature and airflow ratios noted above, only at the zone level, as illustrated in FIG. 7B and defined in Table 1 below.

Responsive to analyzing the zone level plots, one or more zone or data center level actions may be taken to address the cooling issue 750. By way of example, these zone or data center level actions might include one or more of: increasing the cold/hot aisle widths within the zone or data center; blocking cold air leakages within the zone or data center; checking CRAC units for air filter clogging; checking CRAC units for facility fluid flow rate adjustments; replacing higher-powered rack thermal simulators with lower-powered rack thermal simulators to reduce zonal heat flux; mitigating any airflow plenum blockages beneath the raised floor within the zone, or within the data center; or adding one or more CRAC units, or switching ON one or more CRAC units.

Once taking one or more of the rack or zone level actions, and verifying that the maximum $TS_{rack} < T_{spec, max}$, processing returns to the flow of FIG. 7A to evaluate whether maximum air inlet temperatures to the rack thermal simulators are less than specified minimum acceptable air inlet temperature to the respective electronics racks (Max $(TS_{rack}) < (T_{spec, min})$?) 715. If so for any simulator, then an energy inefficiency issue is identified 720, which is addressed (in one embodiment) as set forth in FIG. 7C.

Referring to FIG. 7C, each rack thermal simulator is identified for which $TS_{rack} < T_{spec, min}$, as well as each zone having such an identified rack thermal simulator 760. Rack level analysis and actions are possible, as well as zone level analysis and actions. These different level of analyses and actions may be taken in parallel (as illustrated in FIG. 7C), or in-series, or in the alternative.

Evaluating rack level metrics is facilitated by generating plots of various air temperatures and airflow rates versus rack thermal simulator numbers 765. These plots include: measured air inlet temperatures at the air inlet sides of the rack thermal simulators versus thermal simulator number; air temperature difference between the rack thermal simulator inlet and the perforated tile associated with that rack thermal simulator versus thermal simulator number; air temperature difference between the rack thermal simulator outlet and the rack thermal simulator inlet (e.g., at a same vertical height) versus thermal simulator number; ratio of chilled airflow supplied via perforated tiles to the rack thermal simulators to the rack thermal simulator airflow rate versus thermal simulator number; and the ratio of leakage of airflow associated with a rack thermal simulator to the total airflow supply to a rack thermal simulator (e.g., tile airflow rate+leakage airflow rate) versus thermal simulator number.

One or more rack level actions are then performed based on an analysis of the generated plots. These rack level actions might include: verifying that tiles associated with rack thermal simulator(s) are not totally open (i.e., that there is a tile); replacing existing tiles with less open tiles in front of the rack thermal simulator(s); blocking cold air leakages near the rack thermal simulator(s) 770.

Analyzing zone level metrics is facilitated by generating zone level plots for the corresponding air temperature and airflow rates as analyzed at the rack level 775. Each of these zone level variables is defined in Table 1 below. Once the respective plots have been generated and analyzed, one or more zone or data center level actions may be taken 780. By way of example, these actions might include: reducing the cold aisle width or hot aisle width within the effected zone; blocking cold air plenum leakages within the zone; reducing airflow through one or more CRAC unit(s) (via variable frequency device controls) or switching OFF one or more CRAC units; reducing a facility fluid flow rate into one or more CRAC units associated with the zone; and increasing the facility water set point temperature into the one or more CRAC units.

After verifying that the one or more changes made at the rack or zone level have addressed the energy inefficiency issue, then processing returns to FIG. 7A to generate an installation plan for the data center 725. This installation plan includes, in one embodiment: recording rack thermal simulator locations, and identity of the respective electronics racks simulated; recording tile locations and types of tiles (free area openness); recording CRAC unit locations; generating a detailed layout of the raised floor facility including aisle width, aisle orientation, ceiling height and miscellaneous boundary conditions; and recording thermal measurements and metrics (e.g., at the rack thermal simulator, zone and data center levels). After generating an installation plan, processing returns to FIG. 4 for the installation of the electronics rack(s) and other electronics equipment into the data center, as per the installation plan 440. In one embodiment, this installation might comprise replacing the rack thermal simulators with the respective electronics racks, or alternatively, reconfiguring the rack thermal simulators by adding the electronics subsystems of the electronics racks to an existing frame structure of the rack thermal simulator. After installing the electronics racks within the data center, processing waits for a subsequent data center upgrade 450 before repeating the process.

As noted, Table 1 below provides definitions for the variables employed in the process flows described hereinabove.

TABLE 1

| Variable | Definition |
| --- | --- |
| N | Total number of electronics racks to be installed |
| $R_1 \ldots R_N$ | Names of the N racks to be installed |
| $P_1 \ldots P_N$ | Rack powers (kW) of the racks to be installed |
| $F_1 \ldots F_N$ | Rack airflow rates (m³/s) of the racks to be installed |
| $S_1 \ldots S_N$ | Names of the rack thermal simulators (1:1 with $R_1 \ldots R_N$) |
| $PS_1 \ldots PS_N$ | Rack power settings (kW) of the rack thermal simulators |
| $FS_1 \ldots FS_N$ | Rack airflow rate settings of the rack thermal simulators |
| M | Total number of CRAC units |
| $C_1 \ldots C_M$ | Heat removal capabilities of the CRAC units |
| $A_1 \ldots A_M$ | Airflow rates (m³/s) of the CRAC units (measured or rated) |
| $P_{total}$ | Sum of rack powers (kW) of the electronics racks to be installed |
| $C_{total}$ | Sum of the heat removal rates (kW) for the CRAC units (measured or rated) |

TABLE 1-continued

| Variable | Definition |
|---|---|
| $A_{total}$ | Sum of airflow rates (m³/s) for the CRAC units (measured or rated) |
| $F_{total}$ | Sum of airflow rates (m³/s) of the racks to be installed |
| $P_{miscellaneous}$ | Power (kW) used in room lighting, power distribution units, CRAC units |
| $PR_{total}$ | Total power (kW) used in the data center |
| x | Total number of perforated tiles |
| $FT_1 \ldots FT_x$ | Measured airflow rates (m³/s) through the perforated tiles |
| $TT_1 \ldots TT_x$ | Measured air temperatures (° C.) at the perforated tiles |
| $TS_{in,1} \ldots TS_{in,N}$ | Measured air temperatures (° C.) at the air inlet to rack thermal simulators (at specific height, e.g., 1.75 m) |
| $TS_{out,1} \ldots TS_{out,N}$ | Measured air temperatures (° C.) at air outlet of rack thermal simulators (at specific height, e.g., 1.75 m) |
| $TC_{in,1} \ldots TC_{in,M}$ | Measured air temperatures (° C.) at inlet to CRAC units |
| $TC_{out,1} \ldots TC_{out,M}$ | Measured air temperatures (° C.) at exit of CRAC units |
| $\rho$ | Air mass density (kg/m³), available from any heat transfer handbook |
| Cp | Air specific heat (J/kg-K), available from any heat transfer handbook |
| Y1 | Lower error threshold for energy balance check (e.g., 0.9) |
| Y2 | Upper error threshold for energy balance check (e.g., 1.1) |
| $T_{spec,max}$ | Maximum allowable electronics rack inlet air temperature (e.g., 32° C.) |
| $T_{spec,min}$ | Minimum allowable electronics rack outlet air temperature (e.g., 24° C.) |
| $\Delta T_{in,rack}$ | Air temperature difference between rack thermal simulator inlet and perforated tile associated therewith |
| $\Delta T_{rack}$ | Air temperature difference between rack thermal simulator outlet and inlet at the same vertical height |
| $\phi_{rack}$ | Ratio of chilled airflow rate supplied via perforated tiles to a rack simulator and the rack simulator airflow rate |
| $\sigma_{rack}$ | Ratio of leakage flow associated with a rack simulator to the total airflow supply to the rack simulator (tile + leakage) |
| $q''_{rack}$ | Heat flux in (W/m²) for a rack simulator and its associated area |
| $\Delta T_{in,zone}$ | Average zonal value for air temperature difference between rack simulator inlet and perforated tile associated with it |
| $\Delta T_{zone}$ | Average zonal value for air temperature difference between rack simulator outlet and inlet at the same vertical height |
| $\phi_{zone}$ | Average zonal value for ratio of chilled airflow rate supplied via perforated tiles to a rack simulator and the rack simulator airflow rate |
| $\sigma_{zone}$ | Average zonal value for ratio of leakage flow associated with a rack simulator to the total airflow supply to the rack simulator (tile + leakage) |
| $q''_{zone}$ | Average zonal value for heat flux in (W/m²) for a rack simulator and its associated area |
| $\Delta T_{in,DC}$ | Average data center value for air temperature difference between rack simulator inlet and perforated tile associated therewith |
| $\Delta T_{DC}$ | Average data center value for air temperature difference between rack simulator outlet and inlet at the same vertical height |
| $\phi_{DC}$ | Average data center value for ratio of chilled airflow rate supplied via perforated tiles to a rack simulator and the rack simulator airflow rate |
| $\sigma_{DC}$ | Average data center value for ratio of leakage flow associated with a rack simulator to the total airflow supply to the rack simulator (tile + leakage) |
| $q''_{DC}$ | Average data center value for heat flux in (W/m²) for a rack simulator and its associated area |

The detailed description presented above is discussed in part in terms of procedures which may be executed on a computer, a network or a cluster of computers. These procedural descriptions and representations are used by those skilled in the art to most effectively convey the substance of their work to others skilled in the art. They may be implemented in hardware or software, or a combination of the two.

A procedure is here, and generally, conceived to be a sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; various operations described herein may be automatic machine operations. Useful machines for performing the operations of the present invention include general purpose digital computers or similar devices.

Selected steps of the method may be executed on a general computer, such as a mainframe computer, personal computer or the like and pursuant to one or more, or a part of one or more, program modules or objects generated from any programming language, such as C++, Java, Fortran or the like. And still further, a step, or a file or object or the like implementing a step, may be executed by special purpose hardware or a circuit module designed for that purpose.

Aspects of the invention are implemented (in one example) in a high level procedural or object-oriented programming language to communicate with a computer. However, the inventive aspects can be implemented in assembly or machine language, if desired. In any case, the language may be a compiled or interpreted language.

The invention may be implemented as a mechanism or a computer program product comprising a recording medium. Such a mechanism or computer program product may include, but is not limited to CD-ROMs, diskettes, tapes, hard drives, computer RAM or ROM and/or the electronic, magnetic, optical, biological or other similar embodiment of the program. Indeed, the mechanism or computer program product may include any solid or fluid transmission medium, magnetic or optical, or the like, for storing or transmitting signals readable by a machine for controlling the operation of a general or special purpose programmable computer according to the method of the invention.

Aspects of the invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another environment (such as a partially clustered computing environment). The system may be specially constructed for the required purposes to perform, for example, the method steps of the invention or it may comprise one or more general purpose computers as selectively activated or reconfigured by a computer program in accordance with the teachings herein stored in the computer(s). The procedures presented herein are not inherently related to a particular computing environment. The required structure for a variety of these systems will appear from the description given.

Again, the capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of laying out a data center comprising:
   placing a plurality of dummy racks in the data center in a data center layout to establish a physically imitated data center, wherein each dummy rack imitates at least one operational characteristic of at least one respective electronics rack of a plurality of electronics racks to be disposed in the data center, and each dummy rack is different from the at least one respective electronics rack, and comprises:
      at least one air-moving device providing an airflow through the dummy rack from an air inlet side to an air outlet side thereof, wherein provided airflow through the dummy rack correlates to anticipated airflow through the at least one respective electronics rack; and
      an adjustable heat source, the adjustable heat source heating air passing through the dummy rack, wherein at least one of airflow intake at the inlet side of the dummy rack or heated airflow exhaust at the air outlet side of the dummy rack is controlled to physically imitate anticipated airflow intake to the at least one respective electronics rack during operation thereof or heated air exhaust from the at least one respective electronics rack during operation thereof;
   monitoring temperature within the physically imitated data center at multiple locations, and verifying the data center layout if the measured temperatures at the multiple locations are within respective acceptable temperature ranges for the data center when containing the plurality of electronics racks; and
   establishing the plurality of electronics racks within the data center using the verified data center layout, the establishing comprising for each dummy rack of the plurality of dummy racks, reconfiguring or replacing the dummy rack with the at least one respective electronics rack of the plurality of electronics racks.

2. The method of claim 1, further comprising, responsive to verifying the data center layout, generating an installation plan for installing the plurality of electronics racks within the data center, and wherein the establishing includes employing the installation plan in installing the plurality of electronics racks within the data center.

3. The method of claim 2, wherein the installation plan comprises one or more of:
   (i) location of dummy racks and identification of which electronics racks are represented by which dummy racks;
   (ii) record of tile locations and tile types within the data center;
   (iii) record of computer room air-conditioning unit location(s) within the data center;
   (iv) detailed layout of data center facility, including aisle widths, aisle orientation, ceiling height and boundary conditions; or
   (v) record of thermal measurements and metrics for the physically imitated data center.

4. The method of claim 1, wherein monitoring temperature at the plurality of locations includes monitoring inlet air temperature ($TS_{rack}$) to at least one dummy rack of the plurality of dummy racks, and identifying a cooling problem for the data center if a maximum inlet air temperature to the at least one dummy rack is greater than a maximum allowable inlet air temperature to the at least one respective electronics rack imitated by the at least one dummy rack, or identifying an energy inefficiency problem for the data center if the maximum inlet air temperature to the at least one dummy rack is less than a minimum allowable inlet air temperature for the at least one respective electronics rack imitated by the at least one dummy rack, and responsive to identifying a cooling problem or an energy inefficiency problem, making a change to the data center layout, and subsequently repeating the monitoring for the changed data center layout.

5. The method of claim 4, wherein responsive to identifying a cooling problem, the method further comprises analyzing rack level metrics for the plurality of dummy racks in the data center, and based on analysis of the rack level metrics, changing the data center layout by at least one of:
- changing a number of perforated tiles disposed adjacent to the at least one dummy rack to increase an amount of cold air to an air inlet side of the at least one dummy rack;
- changing an amount of cold airflow leakage near the at least one dummy rack from a cold air plenum supplying cold air to the air inlet side of the at least one dummy rack;
- installing an air-to-liquid heat exchanger in association with the at least one dummy rack to reduce temperature of airflow exhausting from an air outlet side of the at least one dummy rack; or
- using at least one airflow arrester adjacent to the at least one dummy rack to block airflow from the air outlet side thereof to the air inlet side.

6. The method of claim 5, wherein analyzing rack level metrics includes plotting for the plurality of dummy racks at least one of:
- inlet air temperature versus dummy rack number;
- air temperature difference between dummy rack inlet air temperature and perforated tile air temperature associated with the dummy rack versus dummy rack number;
- air temperature difference between the air outlet side and the air inlet side of the dummy rack at a same vertical height within the data center versus dummy rack number;
- ratio of cold airflow rate supplied via perforated tiles associated with the dummy rack to the airflow rate through the dummy rack versus dummy rack number; or
- ratio of leakage flow associated with the dummy rack to the total airflow supply to the dummy rack versus dummy rack number.

7. The method of claim 4, wherein responsive to identifying a cooling problem for the at least one dummy rack, the method further comprises identifying a zone within the data center within which the at least one dummy rack resides, and analyzing zone level metrics for the identified zone within which the at least one dummy rack resides, and responsive to analyzing the zone level metrics for the at least one dummy rack, taking at least one zone level or data center level action to address the cooling problem for the at least one dummy rack, the at least one zone level or data center level action comprising at least one of:
- changing a width of a cold air aisle or hot air aisle within the data center;
- blocking cold air leakage(s) from a cold air plenum within the identified zone;
- checking computer room air-conditioning for air filter clogging;
- adjusting computer room air-conditioning by changing facility coolant flow rate therethrough;
- reducing zonal heat flux within the identified zone by switching at least one higher powered dummy rack for at least one lower powered dummy rack;
- analyzing the cold air plenum for possible airflow blockage(s); or
- adding additional computer room air-conditioning capability to the data center.

8. The method of claim 7, wherein analyzing zone level metrics includes plotting for a plurality of zones in the data center at least one of:
- average zonal inlet air temperature to dummy racks in the zone versus zone number;
- average zonal value for air temperature difference between dummy rack inlet and perforated tile(s) associated with the dummy rack versus zone number;
- average zonal value for air temperature difference between dummy rack outlet and dummy rack inlet at a same vertical height within the data center versus zone number;
- average zonal value for ratio of cold airflow rate supplied via perforated tiles to a dummy rack to the dummy rack airflow rate versus zone number; or
- average zonal value for ratio of leakage flow associated with a dummy rack to the total airflow supply to the dummy rack versus zone number.

9. The method of claim 4, wherein responsive to identifying an energy inefficiency problem, the method further comprises analyzing rack level metrics for the plurality of dummy racks in the data center, and based on analysis of the rack level metrics, changing the data center layout by at least one of:
- changing a number of or configuration of perforated tiles disposed adjacent to the at least one dummy rack to decrease an amount of cold air to an air inlet side of the at least one dummy rack;
- reducing an amount of cold airflow leakage near the at least one dummy rack from a cold air plenum supplying cold air to the air inlet side of the at least one dummy rack;
- installing an air-to-liquid heat exchanger in association with the at least one dummy rack to reduce temperature of airflow exhausting from an air outlet side of the at least one dummy rack; or
- using one or more airflow arresters adjacent to the at least one dummy rack to block airflow from the air outlet side thereof to the air inlet side.

10. The method of claim 4, wherein responsive to identifying an energy inefficiency problem for the at least one dummy rack, the method further comprises identifying a zone within the data center within which the at least one dummy rack resides, and analyzing zone level metrics for the identified zone within which the at least one dummy rack resides, and responsive to analyzing the zone level metrics for the at least one dummy rack, taking at least one zone level or data center level action to address the energy inefficiency problem for the at least one dummy rack, the at least one zone level or data center level action comprising at least one of:
- reducing a width of a cold air aisle or hot air aisle within the data center;
- blocking cold air leakages from a cold air plenum within the identified zone;
- reducing computer room air-conditioning cold airflow into the data center or switching OFF one or more computer room air-conditioning units within the data center;
- reducing facility coolant flow rate through one or more computer room air-conditioning units to increase a temperature of cold air being provided to the data center by the one or more computer room air-conditioning units; or
- increasing a facility coolant set point temperature.

11. The method of claim 1, wherein placing the plurality of dummy racks further comprises obtaining a list of N electronics racks to be installed in the data center, obtaining a list of rated powers and rated airflows for the N electronics racks, obtaining N dummy racks having adjustable power and airflow capabilities, and adjusting at least one of power or airflow settings for the N dummy racks so that there is a 1:1 correspondence of power consumption or airflow between the N dummy racks and the N electronics racks.

12. The method of claim 11, further comprising establishing M computer room air-conditioning units within the data center with airflow capabilities $A_1 \ldots A_M$, and heat removal capabilities $C_1 \ldots C_M$, and calculating a sum of rated electronics rack powers for the electronics racks to be installed ($P_{total}$), calculating a sum of heat removal capabilities for the computer room air-conditioning units ($C_{total}$), calculating a sum of rated airflow rates for the electronics racks to be installed ($F_{total}$), and calculating a sum of rated airflow rates for the computer room air-conditioning units ($A_{total}$), and wherein the method further comprises verifying that $P_{total} < C_{total}$, and that $F_{total} < A_{total}$.

13. The method of claim 12, further comprising identifying if $P_{total} > C_{total}$ or $F_{total} > A_{total}$, and once identified, adding one or more computer room air-conditioning units to the data center until $C_{total}/P_{total} > 1$, and $A_{total}/F_{total} > 1$.

14. The method of claim 1, wherein placing the plurality of dummy racks comprises placing the plurality of dummy racks in M aisles within the data center, wherein for each aisle of the M aisle of dummy racks there is an associated computer room air-conditioning unit, and heat removal capability of the associated computer room air-conditioning unit is greater than a total rated power consumption for the dummy racks in the respective aisle and airflow rate of the associated computer room air-conditioning unit is greater than the sum of the airflow rates through the dummy racks in the respective aisle.

15. The method of claim 1, further comprising replacing one or more floor tiles in front of the plurality of dummy racks with perforated tiles after placing the plurality of dummy racks in the data center.

16. The method of claim 1, further comprising characterizing the physically imitated data center, wherein characterizing the physically imitated data center comprises recording two or more of:
  power consumption of the dummy racks;
  airflow rates through the dummy racks;
  airflow rates from one or more computer room air-conditioning units within the data center;
  airflow rates through one or more perforated tiles in the data center layout;
  airflow rates due to leakage openings in the data center layout;
  inlet air temperatures to the dummy racks;
  outlet air temperatures from the dummy racks;
  inlet air temperatures to the one or more computer room air-conditioning units within the data center;
  outlet air temperatures from the one or more computer room air-conditioning units within the data center; or
  temperature of airflow from one or more perforated tiles in the data center layout.

17. The method of claim 16, further comprising determining a total power consumption within the physically imitated data center, and a total computer room air-conditioning heat removal capability within the data center, and verifying that the total power consumption within the data center is within an acceptable percentage of the total computer room air-conditioning heat removal capability of the air-conditioning units within the data center.

18. The method of claim 16, further comprising:
  associating each dummy rack of the plurality of dummy racks within the data center layout with one or more perforated tiles of the data center layout;
  associating one or more aisles and one or more zones within the data center layout with specific dummy racks, tiles and computer room air-conditioning units of the data center layout;
  associating cold air leakage flow within the data center layout with specific dummy racks; and
  employing the associations in calculating at least one of rack level metrics, zone level metrics or data center level metrics for the plurality of dummy racks within the physically imitated data center.

19. A method of laying out a data center comprising:
  obtaining N dummy racks corresponding to N electronics racks to be installed in the data center, wherein $N \geq 1$, each dummy rack being different from its corresponding electronics rack, and comprising:
    at least one air-moving device providing an airflow through the dummy rack from an air inlet side to an air outlet side thereof, wherein provided airflow through the dummy rack correlates to the anticipated airflow through the corresponding electronics rack;
    an adjustable heat source, the adjustable heat source consuming power and heating air passing through the dummy rack;
  adjusting at least one of power consumption or airflow settings for the N dummy racks so that each dummy rack has at least one of a power consumption or airflow therethrough which corresponds to a power rating or an airflow rating of its corresponding electronics rack of the N electronics racks;
  physically placing the N dummy racks in the data center using a data center layout to establish a physically imitated data center;
  monitoring temperature of the physically imitated data center at multiple locations, and checking to determine whether there is a cooling problem or an energy inefficiency problem within the physically imitated data center, and if so, correcting the cooling problem or the energy inefficiency problem before verifying the data center layout; and
  establishing the N electronics racks within the data center using the verified data center layout, the establishing comprising for each dummy rack of the N dummy racks, reconfiguring or replacing the dummy rack with a respective electronics rack of the N electronics racks.

20. The method of claim 19, further comprising generating an installation plan for the N electronics racks responsive to determining that measured temperatures at the multiple locations are within respective acceptable temperature ranges for the data center when containing the N electronics racks, wherein the installation plan comprises one or more of:
  (i) location of the N dummy racks and identification of which electronics racks are represented by which dummy racks;
  (ii) record of tile locations and tile types within the data center;
  (iii) record of computer room air-conditioning unit location(s) within the data center;
  (iv) detailed layout of data center facility, including aisle widths, aisle orientation, ceiling height and boundary conditions; or
  (v) record of thermal measurements and metrics for the physically imitated data center.

* * * * *